United States Patent [19]

Fish

[11] Patent Number: 5,006,291

[45] Date of Patent: Apr. 9, 1991

[54] METHOD FOR MAKING FIBER REINFORCED PLASTIC TUBING

[75] Inventor: Elson B. Fish, Lakeville, Ind.

[73] Assignee: Plas/Steel Products, Inc., Walkerton, Ind.

[21] Appl. No.: 945,212

[22] Filed: Oct. 22, 1986

Related U.S. Application Data

[63] Continuation of Ser. No. 726,506, Apr. 24, 1985, abandoned.

[51] Int. Cl.$^5$ ............ B29C 67/00; B29C 71/02
[52] U.S. Cl. ............................... 264/103; 87/1;
87/6; 87/9; 156/149; 156/175; 156/180;
264/137; 264/173
[58] Field of Search .............. 264/103, 136, 137, 173,
264/174, 324; 156/149, 161, 175, 180, 244.12;
138/125, 144, 153, 172; 87/1, 6, 9, 23, 34

[56] References Cited

U.S. PATENT DOCUMENTS

| | | | |
|---|---|---|---|
| 2,602,766 | 7/1952 | Francis | 87/6 |
| 3,007,497 | 11/1961 | Shobert | 138/125 |
| 3,033,729 | 5/1962 | Shobert | 156/149 |
| 3,457,962 | 7/1969 | Shobert | 138/144 |
| 3,470,051 | 9/1969 | Meyer | 264/174 X |
| 3,529,050 | 9/1970 | Smith | 264/137 |
| 3,694,131 | 9/1972 | Stuart | 425/461 |
| 3,769,127 | 10/1973 | Goldsworthy et al. | 156/175 X |
| 4,202,718 | 5/1980 | Mizutani et al. | 156/244.12 X |
| 4,494,436 | 1/1985 | Kruesi | 87/23 |
| 4,515,737 | 5/1985 | Karino et al. | 264/103 X |

Primary Examiner—Leo B. Tentoni
Attorney, Agent, or Firm—Pearne, Gordon, McCoy & Granger

[57] ABSTRACT

Fiber reinforced plastic tubing is formed by an innermost layer of braided strands that include longitudinal stud fill strands within the braid, a second layer of longitudinal strands, and a third layer of braided strands, all thoroughly encased in a monolithic mass of plastic matrix material that is not, itself, divided into layers. The tube is fabricated on a continuous basis by winding two sets of strands in opposite directions on a mandrel and braiding the two sets with each other and with stud fill strands that prevent that first layer of braid from stretching longitudinally and thereby tightening immovably on the mandrel. The strands are braided dry but are wetted with liquid plastic matrix material as the braid is compacted on the mandrel. A fourth set of strands is wetted by liquid plastic matrix material and guided to lie longitudinally along and evenly spaced about the wetted first braid, and fifth and sixth set of strands are braided dry around the fourth set and compacted and wetted to press against the fourth set and to press the fourth set against the first setted braid. No curing is done until after the latter compacting and wetting. The multi-layer tubing is pulled along the mandrel by alternately-operating gripping devices in which a soft tube sealed into a rigid shell is expanded inwardly by fluid pressure between the shell and the soft tube, thereby forcing the soft tube to grip the tubing around the entire circumference of the tubing.

5 Claims, 4 Drawing Sheets

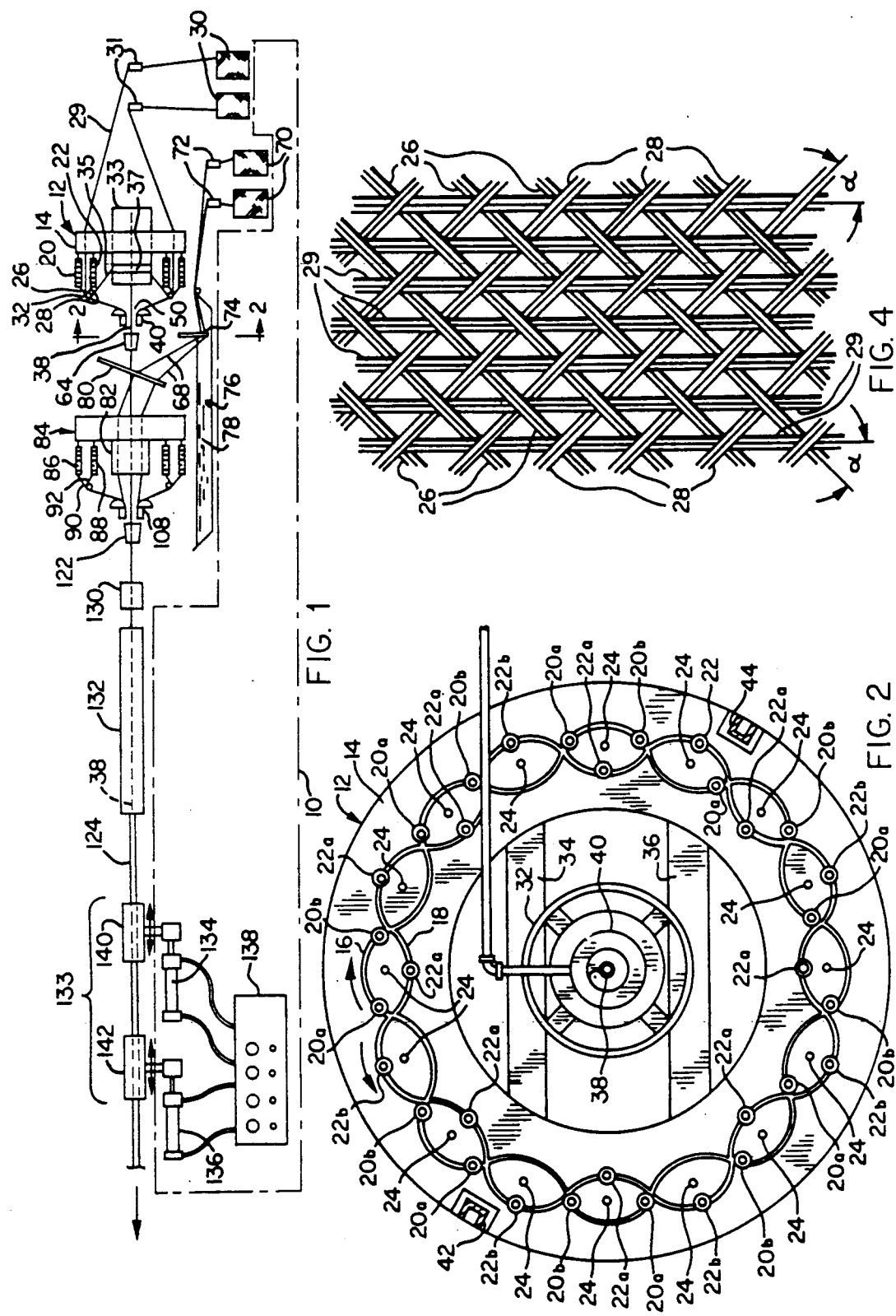

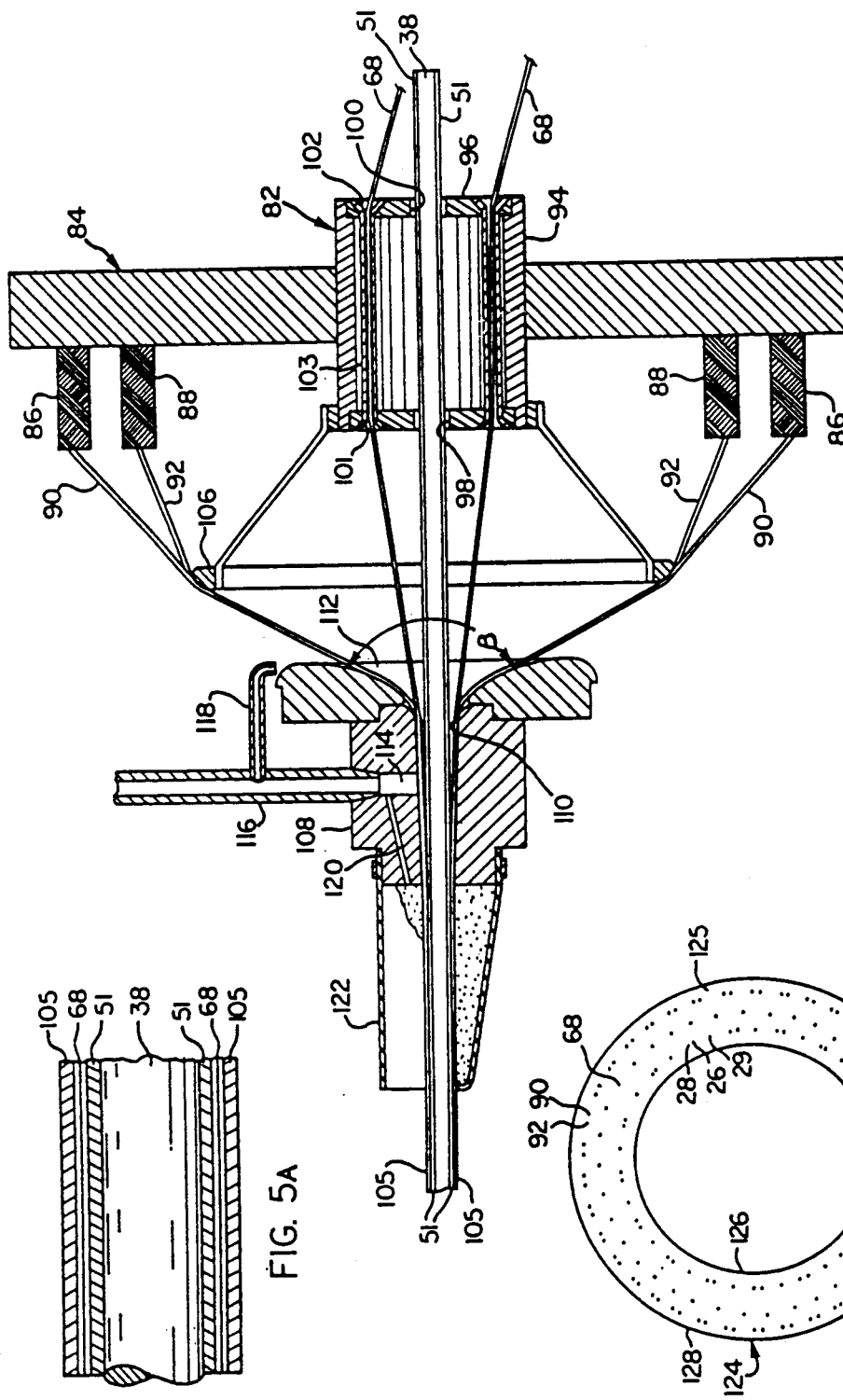
FIG. 5
FIG. 5A
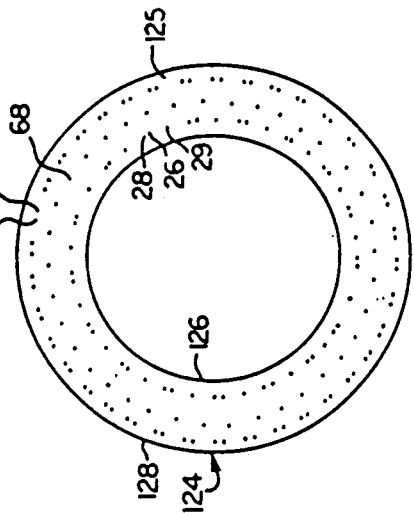
FIG. 7

METHOD FOR MAKING FIBER REINFORCED PLASTIC TUBING

This is a continuation of application Ser. No. 726,506, filed on Apr. 24, 1985, now abandoned.

BACKGROUND OF THE INVENTION

Field of the Invention

This invention relates to improved fiber reinforced tubing and to the method and apparatus for fabricating it on a continuous basis. The apparatus contributes to the production speed and the quality and consistency of product inherent in the method.

Shobert U.S. Pat. No. 3,007,497, issued Nov. 7, 1961, describes the formation of a braided tubular structure formed by helically winding first and second sets of fiber reinforcing strands in mutually opposite directions around a mandrel while simultaneously moving the spools containing the fiber strands alternately in and out with respect to each other and to a third set of strands fed longitudinally into the braid. The third set of strands, which have since come to be known in the industry as "stud fill", help lock the helically wound strands into a reinforcement structure of greater integrity than had been possible prior to that time. However, the dry fiber was braided in a fixed position on the mandrel, which was fed through the braider at a rate corresponding to the braiding progress, and only after the braiding was complete was the mandrel with the braid still on it immersed in a bath of liquid resin material and then placed in a curing mold. After that, the mandrel was withdrawn. Thus, the Shobert U.S. Pat. No. 3,007,497 discloses only a single braided layer, which is not wet with resin until after the braiding is complete, and does not suggest forming the final tubing on a continuous basis.

Shobert, U.S. Pat. No. 3,033,729, issued May 8, 1962, describes a method of making fiber reinforced tubing on a continuous basis. However, the strands forming the innermost reinforcing fiber layer are not included in a braiding operation but are wetted by resin and fed through apertured guides that distribute the strands evenly about a mandrel. The resin on these strands is partially cured so that the partial structure is sufficiently rigid to allow either a normal braid of the type described in Francis U.S. Pat. No. 2,602,766 or in the Shobert '497 patent to be braided thereon continuously, even at a point beyond the end of the mandrel. The braided strands in the second reinforcing layer are put on dry but are then wetted by the uncured part of the resin on the longitudinal strands forming the first reinforcing layer. The structure is then pulled through a second curing station to be completely cured. Tractive force to move the entire two-layer structure is furnished by way of two endless belts that press firmly against opposite sides of the cured two-layer structure at a location beyond the second curing station.

Shobert U.S. Pat. No. 3,457,962, issued July 29, 1969, describes the fabrication of a hollow fiber reinforced plastic rod having several layers of reinforcing strands. The first layer is a standard braid, as are any further odd-numbered layers, that does not contain stud fill and is not expected to slide on the mandrel. Thus, only rods of limited finite length can be formed. The second layer is formed, as are any further even-numbered layers, of longitudinal fill strands wetted by resin before being applied over the next lower braided strands, and it is the wet resin in the even-numbered layers that wets the braided strands in the odd-numbered layers.

Goldsworthy et al, U.S. Pat. No. 3,769,127 issued Oct. 30, 1973, describes the fabrication of multi-layer fiber reinforced tubing on a continuous basis, but none of the layers is braided and the inner-most layer is longitudinal fill. Other layers are helically wound but lack the interlocking strengthening effect of braided strands. Only the longitudinal fill strands are wetted with liquid matrix material; the helically wound strands derive their wetting from the liquid material on the longitudinal fill strands.

SUMMARY OF THE INVENTION

It is an object of the invention to provide an improved method of fabricating multi-layer fiber reinforced plastic tubing on a continuous basis.

Another object is to incorporate liquid plastic matrix material in each braided layer as the braid is being compacted on a mandrel or another layer of the tubing.

Still another object is to form multi-layer fiber reinforced plastic tubing on a continuous basis by including stud fill in the innermost braided layer.

A further object is to provide improved fabrication apparatus for fabricating continuously fiber reinforced tubular structures.

A still further object is to provide improved traction apparatus to pull continuously fabricated tubing away from the region in which it is fabricated.

Another object is to provide a method and apparatus for pultruding a tubular lamination of helically wound strands and more particularly braided strands.

Other objects will become apparent as the description proceeds.

The above-mentioned and other features and objects of this invention and the manner of attaining them will be best understood by reference to the following description of a preferred embodiment of the invention taken in conjunction with the accompanying drawings, wherein:

BRIEF DESCRIPTION OF THE DRAWINGS

In the drawings:

FIG. 1 is a schematic representation of apparatus for fabricating multi-layer fiber reinforced plastic tubing on a continuous basis according to this invention;

FIG. 2 is a view of the downstream side of a first braider as used in the apparatus taken substantially along section line 2—2 of FIG. 1;

FIG. 4 is a developed sketch of the innermost tubular braid formed in the apparatus in FIG. 1;

FIG. 5 is a longitudinal sectional view of part of the apparatus of FIG. 1 associated with a second braider;

FIG. 5a shows in enlarged form a longitudinal section of the formed tubing as it emerges from the second impregnating die;

FIG. 7 is a cross-sectional view of multi-layer fiber reinforced plastic tubing fabricated in accordance with this invention.

Corresponding reference characters indicate corresponding parts throughout the several views of the drawings.

Figure 3:
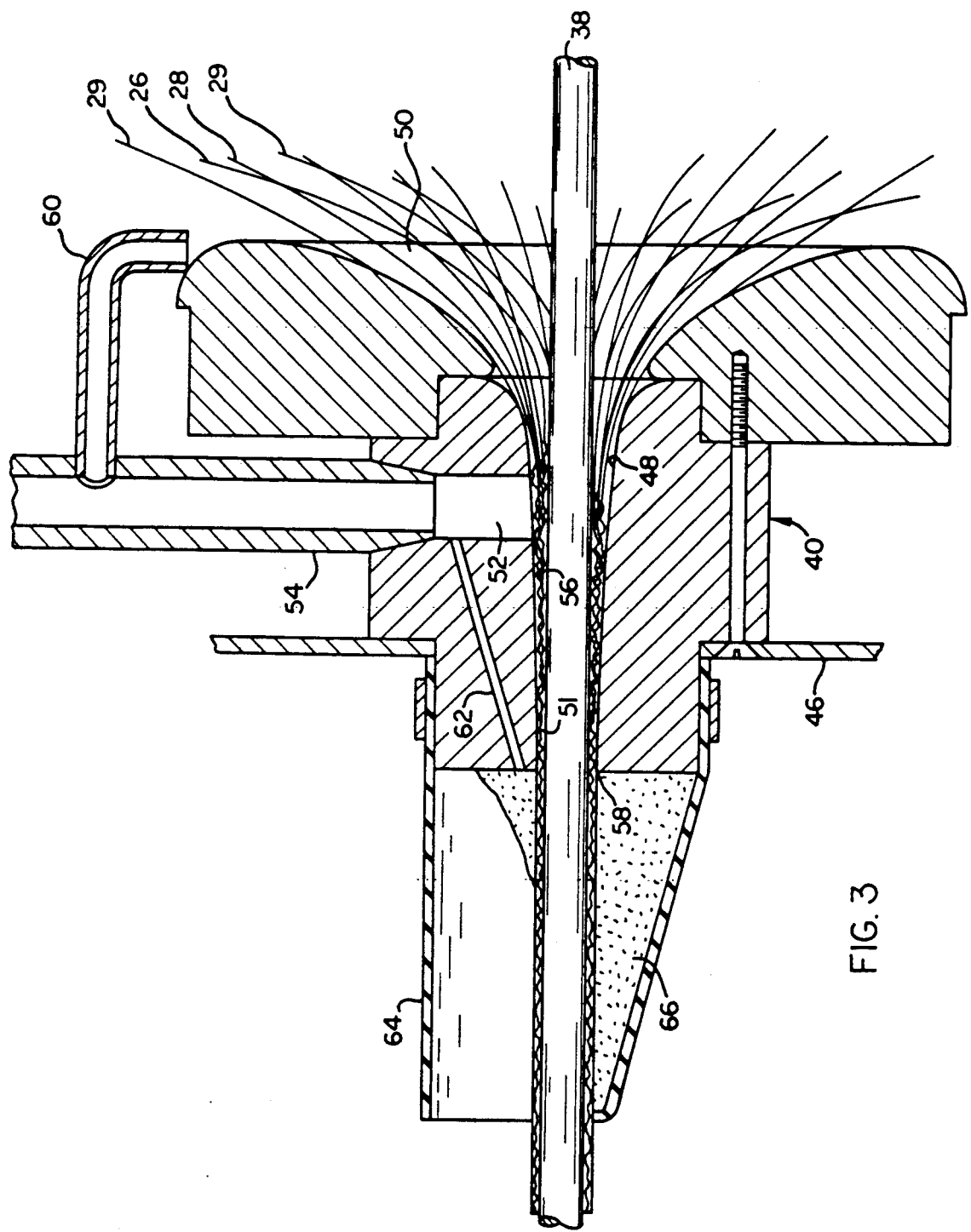
FIG. 3 is a cross-sectional view of one embodiment of a combination resin-impregnating, gathering die or compactor as used in the apparatus in FIG. 1.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Referring to the drawings and in particular to FIG. 1, tube-forming apparatus is supported on an elongated base 10 illustrated in broken lines. The fabrication starts at the right-hand end and proceeds toward the left in the illustration. Therefore, the left-hand end will be referred to as the downstream end of various components in the apparatus.

The fabrication process begins in a braider 12, the downstream face of which is shown in FIG. 2. This is the same type of braider described in the Shobert '497 patent, and it consists, basically, of a circular support 14 with two closed undulating guide tracks 16 and 18 in which spindles of thread are arranged. Standard braiding apparatus in the support 14 moves one set 20 of the spindles clockwise along the track 16 and moves the other set 22 of the spindles counter-clockwise. In the embodiment illustrated there are sixteen (16) clockwise spindles 20 and a like number of counter-clockwise spindles, but the invention is not limited to that specific number. What is important is that the two sets of spindles be able to move along their respective tracks without interfering with each other. The tracks may be considered to have a generally sinusoidal configuration wrapped in a circle, and it is desirable that the subset of spindles 20a be spaced equidistantly between the subset 20b, i.e., about 180 degrees apart along each convolution of the track 16. The subsets of spindles 22a and 22b should likewise be spaced 180 degrees apart along the undulating track 18, and as noted, not directly opposite the spindles on the other track.

The converse undulations of the tracks 16 and 18 form a series of eye-shaped loops—sixteen in this embodiment—and each of these loops has an opening 24, in the center of the loop, through which strands of stud fill are fed. None of the strands, either the stud fill or strands from the spindles 20 and 22 are shown in FIG. 2, but FIG. 1 does show strands 26 and 28 from the spindles 20 and 22 and stud fill strands 29 from spools 30 upstream of the braider 12. The strands 29 pass through tensioning devices 31 to place proper tension on the stud fill. All of the strands 26, 28 and 29, enter an annular space defined substantially by the inner and outer extents of the undulations of the tracks 16 and 18, and as the spindles 20 and 22 move alternately closer to and farther from the axis of the support 14 in following the undulations of the tracks 16 and 18, they braid the strands 26 and 28 around each other and, simultaneously, around the stud fill strands 29. Thus, all three sets of strands 26, 28 and 29 are interbraided together. This braiding forms a hollow tube although the tubular braid is initially so spread out the annular region in which it is formed that its tubular form is not easily recognized.

Just a short distance downstream from the braider 12, the tubular braid, still in relatively large diameter form, is pulled over a guide in the form of a stationary circular hoop 32. The hoop is concentric with the annular space in which the tubular braid is initially formed and its plane is perpendicular to the axis. The hoop 32 may conveniently be supported by a stationary hub 33 (coaxially fixed secured to the support or plate 14), which, in turn, is supported by beams 34 and 36 attached to the upstream side of the stationary supporting frame for braider 12 (FIG. 2). More specifically, hoop 32 is secured by spokes 35 leading from a mounting ring 37 secured coaxially to the hub 33.

A slender mandrel 38 extends axially through and is secured to the hub 33 and, on the downstream side of braider 12, defines the internal configuration of the braiding. In many instances the mandrel 38 will have a circular cross section, but it does not have to be of that shape. Mandrels can have other rounded, as well as polygonal, cross sections.

A short distance downstream of the hoop 32 is a compactor 40, much like a gathering die, which is also shown in FIG. 3, in which the strands 26, 28 and 29 are gathered together into a compact tubular braid around the mandrel 38. The compactor 40 is mounted on beams 42 and 44 that are shown only in cross section in FIG. 2 and are securely fastened to the braider 12 and extend in the downstream direction. A cross member 46 is adjustably attached to the beams to allow the compactor 40 to be precisely centered on the axis of the mandrel. For that reason, the compactor 40 not only gathers and compacts strands 26, 28, 29 into tubular form, it serves a second, equally important function as a device in which liquid plastic matrix material is injected into the interstices in the layer of hollow tubular braid. For that reason, the structure 40 could equally be well thought of as an injector or impregnator.

The compactor 40 has a converging, flared passage 48 with an entrance end 50 flared like the bell of a trumpet on its upstream side facing the hoop 32 and axially spaced only a short distance from the hoop. The strands 26, 28, and 29 forming the hollow tubular braid, are gathered together as they approach the flared entrance end 50 and, in fact, because the gathering occupies such a short axial distance, the individual sets of strands 26, 28 and 29 first make contact with the flared surface of the entrance end at a region substantially out from the axis of the mandrel 38. Sufficient tension is maintained on the longitudinal stud fill set of strands 29 to keep them aligned in radial planes so that in the final tubing the stud fill strands will be straight and will continue to be evenly spaced around the tubing. This is important because it is the fact that the center fill strands 29 are straight, as well as being locked to the other sets of strands 26 and 28 that prevents this layer of braid from stretching longitudinally and tightening, down radially on the mandrel 38 by a Chinese finger effect, as the tubular structure is pulled along the surface of the mandrel 38. At the same time, the interbraiding of the three sets of strands 26, 28 and 29 gives great strength, both longitudinally and radially, to this first hollow tubular braid 51. The helix angle of the sets of strands 26 and 28, relative to the longitudinal stud fill set of strands 29, is shown as the angle "$\alpha$" (actually "$+\alpha$" and "$-\alpha$") in FIG. 4, which is a drawing of a small swatch of the innermost braided tubing developed to flat form. It has been found that the angle $\alpha$ should preferably be less than about 30 degrees and greater than about 15 degrees. One optimum value has been found to be about 20 degrees. The compactor 40 has a radial side passage 52 connected to a pipe 54 to supply liquid plastic matrix material 56 (such as heat hardenable, liquid polyester or epoxy resin) under a low pressure of three or four PSI to the braid 51 just before it reaches its most compact condition against the surface of the mandrel. That occurs at or just upstream of the downstream exit end 58 of the converging passage 48.

Not all of the liquid matrix material that enters the passage 52 moves directly downstream in the converging channel; some of it moves upstream, where there is less pressure, and would flow off of the lower edge of the flared entrance end 50. However, the braided strands 26, 28 intercept this part of the matrix material, by a rotational wiping action or sliding engagement with the surface of flared end 50. The strands 26, 28, 29 are initially wet by this part of the liquid matrix material. In fact, it has been found desirable on some occasions to add a branch supply pipe 60 to the fitting 54 to direct part of the liquid material to the upper surface of the flared end 50 to be sure that all of the incoming strands 26, 28 and 29 are wetted prior to entering passage 48.

The flared entrance end 50 of the converging passage 48 may be described in more geometrical terms by noting that, at least between the extreme upstream end of the compactor 40 and the location of the passage 52, the surface at any point along the axis has a circular cross section. If the axis upstream of the passage 52 were perpendicularly divided into equal planar increments, it would be noted that the diameter of the circle corresponding to the upstream end of each increment would be greater than the diameter of the downstream end of the same increment and, at least over a range of those increments, would be greater than the diameter of the circle at the downstream end of the next adjacent increment by an increasing amount.

It is one of the important aspects of the finished product according to this invention that all of the reinforcement strands are adequately wet with the liquid matrix material so that, when cured, all parts of the surfaces of all of the strands will be directly locked to the plastic matrix and, thus, to each other to result in the strongest reinforced tubing for a given weight. In addition, the novel apparatus and process by which all of the strands are wetted as they come together insures the adequacy of the the wetting as evidenced by the absence of voids, air pockets, and fractures in the finally cured tubing.

There is still another way that liquid matrix material is supplied to strands in the braid 51. A small branch passage 62, e.g., about 1/16" diameter, within the compactor 40 draws a small fraction of liquid matrix material from the main passage 48, which has a typical diameter of about ¼" and directs it out of the exit end of the compactor at a location just above the emerging coated braid 51. A flexible sheet 64, for example, of rubber, formed to a tubular shape, is fastened to the exit end of the compactor 40 to retain the liquid matrix material from the passage 62 and to hold a quantity 66 of this material, which is quite viscous, in place around the coated braid 51 emerging from the exit end 58. The reason for doing this is that as the compacted, coated braid becomes free of the constraint of the converging passage 48, the braid tends to enlarge slightly. If there were no available liquid matrix material 66, a tendency exists for the braid 51 to draw in a little air, which would interfere with impregnation and result in weakening the final product. It may not be necessary to provide the passage 62 if enough extra liquid matrix material is pulled through the converging passage 48 to maintain the supply 66.

The fourth set of strands to be applied to the tubing being fabricated is a set of strands 68 drawn from a group of spindles 70 in FIG. 1. These strands also pass through tensioning devices 72 that supply enough frictional force to hold the strands 68 straight and tensioned as they are laid along the surface of the coated braid 51. However, before the strands 68 reach the braid 51, they pass through a guide plate 74 that has a separate aperture for each strand. This guide plate is immerged in a bath 76 of liquid plastic matrix material 78, and it forces the strands 68 to pass through and be wetted by that material.

The strands 68 then move upward through the annular arrangement of apertures in another guide plate 80. This guide plate redirects the strands 68 to be more nearly parallel to the mandrel 38 as the strands and the mandrel with the first coated braid 51 on it enter a stationary hub 82 of a second braider 84. Except for the hub 82, the braider 84 is much like the braider 12 shown in FIG. 2, but the braider 84 need not have, and in this embodiment does not have any stud fill strands. The Chinese finger effect is utilized to provide a gripping force on the fill strands 68. As in the case of the braider 12, the braider 84 has two sets of spindles 86 and 88 that move around the surface of the braider in mutually opposite directions and simultaneously follow undulating paths that cause them to move in and out relative to the axis. The two sets of strands 90 and 92 on the spindles 86 and 88, respectively, need not be the same as the strands 26, 28 and 29 in the first three sets or the strands 68 of the fourth set, nor is it necessary that there be the same number of spindles or undulations in the tracks as in the braider 12 nor that the strands 90 and 92 be wound at the same speed as the strands 26 and 28.

Figure 6:
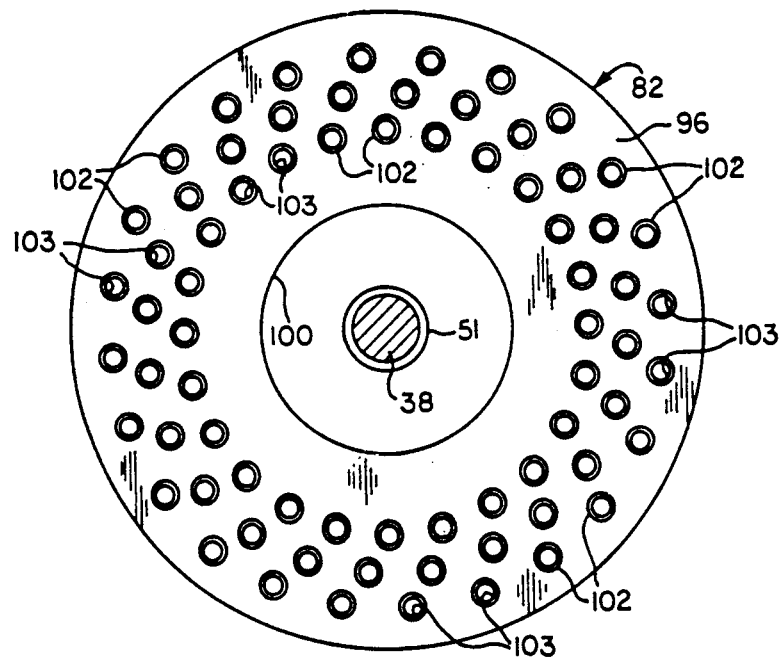
FIG. 6 is an end view of the apertured strand-guiding hub shown in FIG. 5.

FIGS. 5 and 6 show the hub 82 and other components associated with the braider 84. The hub 82 is a stationary hollow cylinder 94 with apertured end plates 96 and 98. The central apertures 98 and 100 allow the mandrel with the coated first layer of braid 51 to pass through, and the other apertures 101 and 102 are evenly spaced around the central aperture to guide the fourth set of longitudinal fill strands 68 so that they will be properly aligned with and evenly circumferentially distributed about the coated braid 51 that forms the first layer of the tubing. Since the strands 68 are coated with liquid matrix material 78 in the bath 76 in FIG. 1 just before they enter the upstream end plate 96, and it is desirable not to allow the liquid to be scraped off into the interior of the cylinder 94 as the coated strands 68 pass through the apertures 102 in the downstream end plate 98, the matching apertures 101, 102 in the end plates 96 and 98 are joined together by small, flared copper tubes 103 having Teflon liners through which the separate strands pass.

The fifth and sixth sets of strands 90 and 92 from spindles 86 and 88, after being braided together into a second hollow tubular braid 105, pass over a stationary guide hoop 106 like the guide hoop 32. The hoop 106 is rigidly supported by the braider 84 and, specifically, in this embodiment, by the hub 82. The hoop keeps the braid 105 spread out so that it enters a second compactor 108 well out from the axis common to this compactor, the mandrel 38, the first compactor 40, and both braiders 12 and 84. The second compactor has a converging passage 110 just like the converging passage 48 in the first compactor except that its minimum cross section is enough larger to allow a second layer comprising the wetted longitudinal stands 68 and the second tubular braid 105 to pass through while being squeezed against the first braid 51 coated with liquid matrix material. The passage 110 has an entrance end 112 flared in the same way that entrance end 50 of the converging passage is flared, and the diameter of the guide hoop 106 and its axial spacing from the compactor 108 cause the second tubular braid 105 to approach the flared entrance end 112 along paths defining an included angle "B" of substantially more than 90 degrees. This enables the strands 90 and 92 to engage the curved surface of the flared end 112 in region greater than twice the diameter of the mandrel 38 to make sure that these strands have ample opportunity to engage that surface and to mop up liquid matrix material thereon.

The main part of the liquid matrix material applied to the strands 90 and 92 is injected through a passage 114 connected by a pipe 116 to a pressurized source of liquid plastic matrix material, in the same manner as is done in the compactor 40. A further similarity is that the pipe 116 has a branch pipe 118 and the compactor 108 has a branch passage 120 leading to a tubular retainer 122. It is important that the second and third layers of reinforcing strands 68, 90 and 92 be amply supplied on the liquid matrix material, as the first braid 51 was, but it may not be necessary to use the branch pipe 118 or the branch passage 120 to do so.

FIG. 7 shows a cross section of the multi-layer tubing 124 as it emerges from the second compactor 108. The tubing comprises the first, inner layer of helically wound strands 26 and 28 interbraided with each other and with the stud fill strands 29, the second reinforcing layer of longitudinal fill strands 68, and the third layer of braided strands 90 and 92. The separate quantities of liquid plastic matrix material accompanying each of the reinforcing layers were applied separately, but, being liquid, flowed together to form a monolithic matrix mass 125 that is not separated into individual layers. Only the reinforcing strands remain identifiably separate as layers.

As a result of the fabricating process, both the inner wall 126 and the outer wall 128 have smooth surfaces without the necessity of having to grind them smooth in a separate operation. The fabrication, itself, is not only carried out at high speed, but the elimination of an additional finishing operation further increases the overall production speed.

As shown in FIG. 1, there may be small cooler 130 just a short distance downstream of the second braider 84. The cooler is not always necessary but may be used if the tubing 124 is to be at rest for awhile. Otherwise, the cooler may be used to retard hardening of the plastic prematurely. This cooler is mounted on the heated die near the entrance. The die entrance is cooled for the purpose of keeping the tube from curing at the die entrance if the machine is stopped for a period of time.

Following the cooler, if there is one, is a curing station 132. In this embodiment, the curing station includes an elongated die shaped according to the outer wall 128 of the tubing 124 and heated by elongated strip heaters along opposite sides. Such curing stations are well known in the fiber reinforced plastic tubing industry. In accordance with this invention, no curing of any intermediate stage of the fabrication of the tubing 124 is done; all curing is carried out in the curing station 132.

After leaving the curing station, the solidified tubing 124 enters the traction station 133. In this embodiment, all motive force to pull the tubing 124 and all of its component reinforcing layers is furnished by two fluid-actuated cylinders 134 and 136 mounted on the base 10 and controlled by a controller 138. The cylinders 134 and 136 may be actuated by either hydraulic or pneumatic fluid and are connected to two gripping devices 140 and 142. The latter are also fluid-actuated and are connected to the controller 138 to be controlled thereby.

Figure 8:
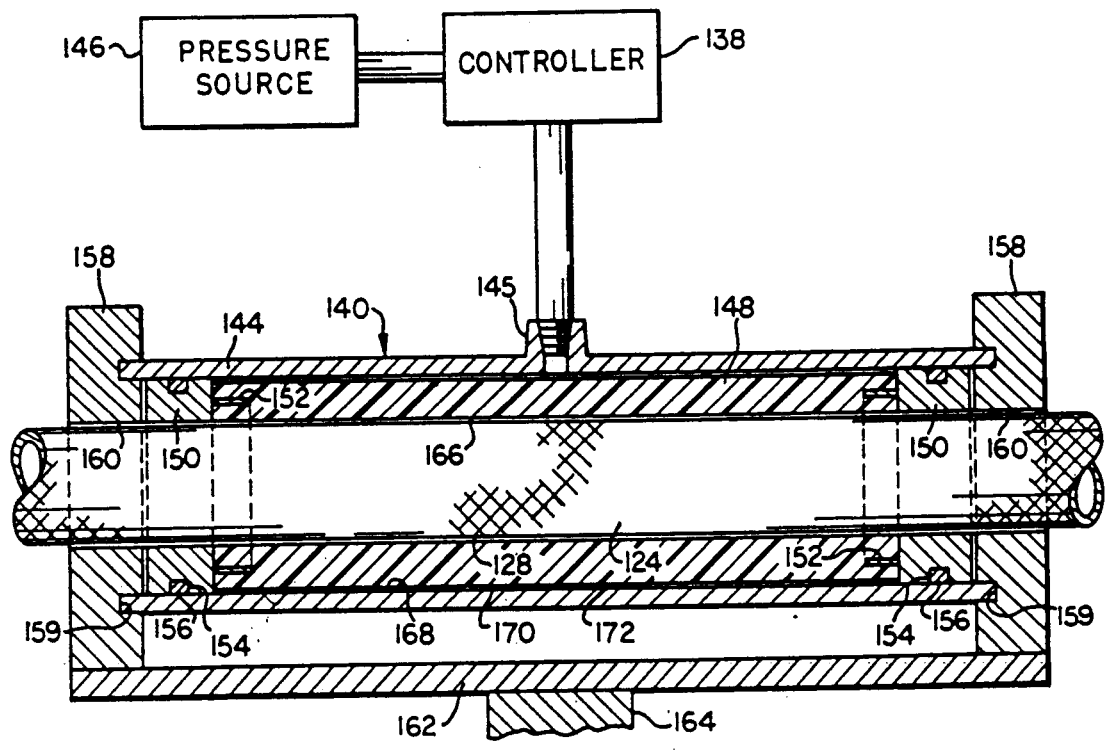
FIG. 8 is a cross-sectional view of a gripper according to this invention and as used in the apparatus in FIG. 1.

One of the gripping devices 140 is shown in more detail in FIG. 8. It includes an outer rigid metal shell 144 in the form of a hollow cylinder that has a coupling 145 by which it may be connected to a source 146 of pressurized fluid such as air or a liquid by way of the control 138. Within the shell 144 is a soft elastomeric tube 148. For example, the tube 148 may have a durometer reading of 80 and a wall thickness of about $\frac{1}{8}''$. Each end of the tube 148 is sealed fluid-tight to the shell 144 by a rigid, annular plug 150 that fits snugly into the shell and includes a tubular projection 152 that extends far enough into the respective end of the tube 148 to prevent any fluid from leaking past the junction between the plug 150 and the tubing. The plug is also provided with an external groove 154 to hold an O-ring 156 that further improves the quality of the seal between the plug 150 and the shell 144. End plates 158 having apertures 160 therein concentric with the shell 144 and large enough to allow the tubing 124 to pass through are rigidly secured to the ends of the shell by means of annular grooves 159 to hold the plugs 150 and the tube 148 in place. The gripping device 140, including end plates 158 is fixedly attached to a carrier 162 that, in turn, is connected to a connecting rod 164 extending from the cylinder 134.

The inner surface 166 of the soft tube 148 has a bore of cross section to match the outer surface 128 of the tubing 124 and to fit sufficiently loosely thereon to allow the tubing 124 to slide easily through the tube 148. If the coefficient of friction between these surfaces is not too high (it should be at least 0.015), it is not necessary that the inner cross section of the tube 148, as defined by the surface 166, be larger than the external dimensions of the tubing 124, as defined by the surface 128.

The diameter of inner surface 168 of the shell 144 is preferably slightly larger than the diameter of the outer surface 170 of the elastomeric tube 148 so that the shell, the tube and the plugs 150 at each end define a cylindrical space 172. In order to grip the tubing 124, the controller is actuated to direct fluid under pressure through the coupling 146 into the space 172 to contract the tube 148 against the tubing 124 with sufficient force to prevent any longitudinal slippage therebetween.

Each gripping device and its associated cylinder goes through a cycle of operating in which the gripper device, for example, the device 140, releases the tubing 124 and the cylinder 134 moves the gripping device to the end of its range of travel toward the braider 84. Then, the controller 138 actuates the gripping device 140 to force it to grip the tubing and actuates the cylinder 134 to move the gripping device and tubing smoothly at a uniform rate of speed away from the braider 84. At or near the opposite end of the range of travel, the controller causes the gripping device to release its grip on the tubing 124, thus ending one cycle.

In general, the gripping devices 140 and 142 are actuated alternately to grip and release the cured tubing 124, and the cylinders 134 and 136 are actuated alternately to move the respective griping device linearly toward and away from the braider 84. It is important that the movement of the tubing be uniform and not jerky. Thus, at least one of the gripping devices 140 and 142 should grip the tubing 124 at all times. However, the movement of each of the gripping devices toward the braider 84 can be much faster than the movement away from the braider, and so it is possible to have an overlapping time when both grippers are gripping the tubing as the responsibility for pulling the tubing 124 is being transferred from the gripper 140 to the gripper 142, or vice versa.

The term "fiber" is used in the foregoing description and the following claims in a generic sense to include any of the fibers known in the industry as being suited for the purpose. In particular, glass fibers of the type described in the aforementioned Shobert and Goldsworthy et al patents are suitable, but not exclusively so. Various liquid plastic matrix materials are also known in the industry and some are described in the aforementioned patents.

Polyester resins, in particular, and epoxies curable by heat are among those known to be satisfactory, but, again, not exclusively so.

Further, the apparatus described includes only two braiders and means to supply one layer of longitudinal fill between the two braided layers, but it is possible to use more layers if even greater strength is desired. The three-layer structure as described herein does provide a most favorable strength-to-weight ratio and makes it possible to fabricate tubing 124 having a wall thickness at least as low as 0.050" instead of having to use a thicker, and therefore heavier, wall thickness of 0.090", which was a minimum wall thickness heretofore.

This invention, except as specified otherwise in the claims appended hereto, is not to be limited to the disclosed number or structure of the laminations in the tubing, since other arrangements can be utilized, such as, for example, two contiguous braided laminations, helical windings with interlaced fill strands and the like.

By interweaving strands 29 with the braided strands 26, 28, the resultant lamination 51 (FIG. 5a) may be slidingly pulled along stationary mandrel 38. Without strands 29, the pulling force on strands 26, 28 would cause them to grip mandrel 38 so tightly, like a Chinese finger, to prevent movement. This invetion provides for pultruduing a braided tube over a stationary mandrel.

While there have been described above the principles of this invention in connection with specific apparatus, it is to be clearly understood that this desciption is made only by way of example and not as a limitation to the scope of the invention.

What is claimed is:

1. A method of fabricating multi-layer fiber reinforced plastic tubing on a continuous basis comprising the steps of:

braiding a first layer of strands about a stationary mandrel by weaving together first, second, and third sets of strands, said second and third sets being wound oppositely about said mandrel while said first set is pulled longitudinally and interwoven therewith, whereby said first set inhibits said braided first layer from gripping said mandrel to an extend as will prevent movement of the resulting tubular layer with respect to said mandrel;

simultaneously radially gripping and axially pulling said first layer relative to said stationary mandrel;

prewetting said first layer by applying a liquid plastic matrix material to said second and third strands prior to engagement about said mandrel;

drawing said braided layer through a die orifice that defines with said mandrel a decreasing annular clearance through which said layer moves to gradually fully compact said strands onto said mandrel;

applying a liquid plastic matrix material under pressure to said first braided layer of stands while said layer is being gradually compacted and confined between said die orifice and said mandrel and before said braided layer is fully compacted;

applying a liquid plastic matrix material to said first braided layer of strands at the exit end of said orifice by surrounding said mandrel and said braided layer with said liquid plastic to inhibit air from being drawn into said layer as it expands following compaction; and curing the liquid plastic matrix material while said tubular braid is moved along and is supported by said mandrel and while the liquid plastic matrix material is radially confined between the mandrel and a surrounding outer die to form self-supporting tubing.

2. The method of claim 1, wherein said gripping is accomplished by a uniformly applied circumferential force.

3. The method of claim 1 comprising the additional step of cooling the structure comprising the first, second and third sets of stands before curing the plastic matrix material.

4. The method of claim 1 in which, after being interbraided, the first, second, and third sets of strands are moved along generally converging paths to a region of maximum compaction and are wetted while being moved along said generally converging paths and before reaching the region of maximum compaction.

5. The method of claim 1 wherein said prewetting is performed by wetting an annular surface which surrounds said mandrel with liquid plastic, and rubbing said second and third strands against said wetted surface while they are being wound around said mandrel.

* * * * *